United States Patent [19]

Ville et al.

[11] Patent Number: 4,543,074
[45] Date of Patent: Sep. 24, 1985

[54] DEVICE FOR COUPLING TWO ROTARY MACHINES

[75] Inventors: Daniel Ville, Meudon la Forêt; Michel R. C. Virmoux, Sartrouville, both of France

[73] Assignee: Hispano-Suiza, Saint Cloud, France

[21] Appl. No.: 510,828

[22] Filed: Jul. 5, 1983

[30] Foreign Application Priority Data

Jul. 8, 1982 [FR] France ............... 82 12321

[51] Int. Cl.[4] .................. F16D 43/20; F16D 9/00
[52] U.S. Cl. .................. 464/33; 192/56 R; 403/2
[58] Field of Search ........... 192/46, 56 R, 114 R, 192/150; 403/2, DIG. 3; 464/30, 32, 33, 37

[56] References Cited

U.S. PATENT DOCUMENTS

| 2,964,931 | 12/1960 | Sorenson | 464/33 X |
| 3,126,723 | 3/1964 | Dugay | 464/33 |
| 3,536,174 | 10/1970 | Vance | 192/56 R |
| 3,682,506 | 8/1972 | Bruyere et al. | 192/114 R X |

FOREIGN PATENT DOCUMENTS 1521603 3/1968 France .
2414146 8/1979 France .
558118 6/1977 U.S.S.R. ............ 192/56 R Primary Examiner—Stuart S. Levy
Assistant Examiner—Daniel P. Stodola
Attorney, Agent, or Firm—Oblon, Fisher, Spivak, McClelland & Maier

[57] ABSTRACT

A device for coupling two rotary machines with provision for automatic uncoupling under certain operational conditions, comprising a first shaft and a second shaft in two parts which are connected for motion transmission in a first sense by a dog clutch connection and in a second sense by an intermediate co-axial shaft and transverse pins. In the first sense an accidental excess torque is limited by fracture of a frangible groove section disposed in the first shaft. In the second sense in which a substantially lower torque is exerted, this is limited by the fracture of a second frangible groove section disposed in the intermediate shaft. After fracture of this second groove section, the first shaft and one part of the second shaft will become spaced apart and the one shaft part is maintained in this position by a blocking mechanism comprising at one end a cylindrical bush accommodating a radial spring and balls which are displaced to an internal groove of the other shaft part.

3 Claims, 5 Drawing Figures

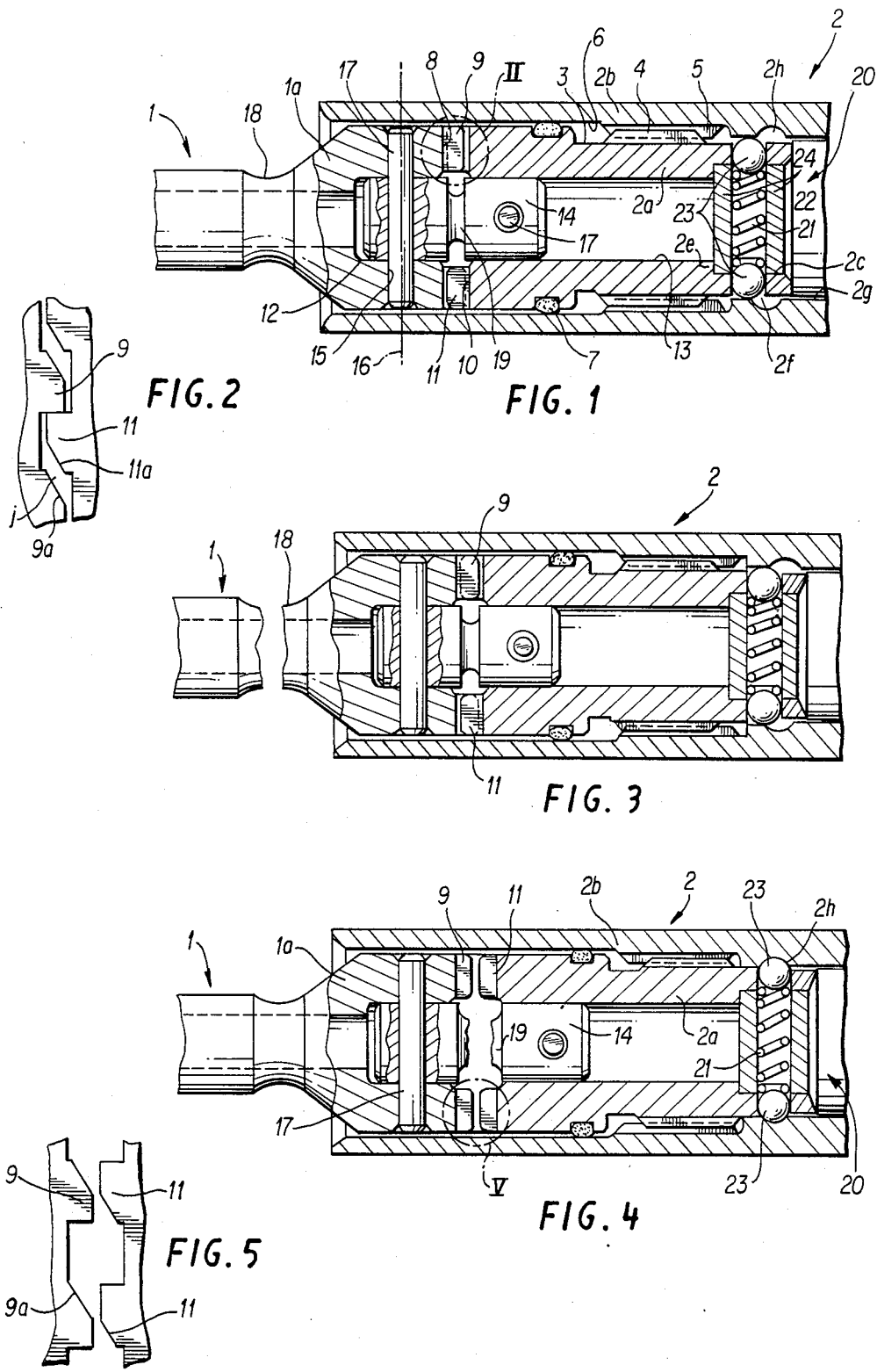

DEVICE FOR COUPLING TWO ROTARY MACHINES

BACKGROUND OF THE INVENTION

1. Field of the Invention

The present invention relates to a device for coupling two rotary machines which provides for automatic uncoupling under certain conditions.

2. Summary of the Prior Art

As is known, dependent upon operational phases of two rotary machines, in certain applications, the transmission of motion may take place either in a first sense, or in an opposed sense to the first which will be referred to as the second sense of motion transmission. A torque level which is substantially different may thus be exerted in each sense. It will be assumed as a consequence that the first selected sense of transmission of motion corresponds to a higher torque level and the second sense to a lower torque level. These operational conditions, for example, will apply particularly where one of the rotary machines is a turbo-machine starter and the other rotary machine is the auxiliaries gearbox of the said turbo-machine utilized for driving various auxiliaries through several kinematic chains. During the starting of the turbo-machine, the starter drives at least one rotary body of the turbo-machine through the intermediary of the auxiliaries gearbox and in this first phase a substantial torque is transmitted through the line of transmission shafts. After normal running has been established, the turbo-machine drives the rotary parts of the auxiliaries gearbox and one shaft of the starter continues to be driven through its connection with the auxiliaries gearbox. In this second phase a torque is exerted which is obviously much lower than during the first phase as it is only required to drive the shaft of the starter without any opposing force, under normal operational conditions.

These results are obtained in known manner through power transmission means between the two rotary machines which are different in dependence upon the sense of motion transmission. For example, in the first sense of motion transmission where the torque level exerted is higher, this transmission is effected by a dog-clutch connection between a first and a second shaft. In the second sense of motion transmission opposed to the first sense this transmission is effected through an intermediate shaft of which each end is respectively disposed in the interior of a bore of the first shaft and a bore of the second shaft is rigid respectively with each of the first and second shafts, for example through a drive pin. In the two operational phases which apply in dependence upon the sense of motion transmission corresponding to the torque levels of a different order of value, it is necessary in order to avoid substantial damage or successive deteriorations in the parts in the drive train to protect the rotary machines in the eventuality of the accidental production in the power transmission line of an excess torque which may result from various originating causes which it is not possible to control entirely as a result of operational conditions imposed on the machines.

French Pat. No. A 1 521 603 describes several embodiments of torque-limiting devices employed in an engine kinematic chain comprising a plurality of motion transfers. A different torque limiter constituted by a hollow piece having a calibrated section of lower strength is integrated in this motion transfer chain. This known arrangement enables protection of several different units to which the motion is transmitted by a different train with limitation in the torque to a different level in accordance with the requirements of each chain. However, the proposed solution does not enable the protection of two rotary machines in which the transfer of motion can take place in the two senses with a torque level which is substantially different in each sense.

French Pat. No. A 2 094 274 relates to a bi-directional torque limiter in which a connection biased by a spring is provided between the driving and the driven elements and in which a member taking part in the transmission is adapted so as to be displaced on encountering the action of a spring in the case of an excess torque in order to engage with a fixed element. The embodiment described calls for the use of two ball systems for the transmission and this solution has been found inappropriate for certain uses and torque levels which it is proposed can be met by the present invention and it is similar for adjustment to different torque values which is proposed by the cited patent by giving an appropriate form to the seatings of the balls.

U.S. Pat. No. 2,964,931 describes an uncoupling device in which a shaft comprises a reduced section constituting a first torque limiter, this shaft is coupled to another shaft by a dog-clutch engaging in one sense of rotation and disengaging in the other sense and an intermediate connecting shaft also comprising a reduced section constituting a second torque limiter. The solution proposed by this patent enables uncoupling in the case of failure caused by torsion forces but does not permit uncoupling caused by alternating deflections created by radial forces acting on the shafts.

An object of the present invention is to overcome the disadvantages of previously known solutions.

A further object is to provide a device applicable particularly in the aeronautical field where rotary machines operate at very high rotational speeds, for example of the order of 20,000 r.p.m.

SUMMARY OF THE INVENTION

According to the present invention there is provided in a frangible device for coupling two rotary machines between which power is transmitted, a first shaft connected to one said machine, having a bore in one end thereof, and a frangible groove, a second shaft connected to the other said machine and having a bore in one end thereof, means defining a dog clutch operative between the first and second shafts in a first rotational sense, an intermediate shaft accommodated in the respective end bores of the first and second shafts, fast for rotation with said shafts, and having a frangible groove adapted to fracture at a lower torque value than that of the frangible groove of the first shaft and under conditions in which the sense of motion transmission is opposite to that intended to fracture the frangible groove of the first shaft, said intermediate shaft having two parts after fracture, means operative in the event of fracture of the frangible groove of the intermediate shaft to space the first and second shafts apart and the fractured parts of the intermediate shaft whereby to avoid mutual contact of these parts, said means serving to prevent axial motion of the second shaft under these conditions, the improvement comprising the provision on the dogs of the clutch of inclined opposed faces on the two halves thereof and spaced such that alternating deflections exerted on the first and second shafts causes uncoupling of the two halves of the clutch and thus of the shafts by the inclined faces riding up the one on the other, means operative in the event of fracture of the frangible groove of the intermediate shaft to retain one part of the fractured intermediate shaft rigid with the second shaft, said means operative in the event of fracture of the frangible groove of the intermediate shaft to space the first and second shafts apart, including a first part of the second shaft, a second part of the second shaft having a bore with a groove in the bore, spline means coupling the first and second parts, balls disposed adjacent the end of the first part of the second shaft in transverse apertures thereof, a compression spring, a transverse bush housing the compression spring so that opposed ends thereof bias the balls radially outwardly, the arrangement being such that in the event of axial displacement of the first part of the second shaft relative to the second part thereof, the balls are displaced outwardly under the action of the spring and centrifugal force into the groove of the bore of the second shaft and are maintained therein so that contact between the dogs of the clutch and between the fractured ends of the intermediate shaft are prevented.

BRIEF DESCRIPTION OF THE DRAWINGS

FIG. 1 is a view in longitudinal section of a frangible coupling device according to the invention for use between two rotary machines shown in the case of normal operation;

FIG. 2 is a fragmentary developed view showing a detail indicated by a circle II in FIG. 1, relating to power transmission means between the two rotary machines including a dog clutch connection;

FIG. 3 is a view similar to FIG. 1 showing the device after the action of a first torque-limiter in the case of operation in a first motion sense;

FIG. 4 is a view similar to FIGS. 1 and 3 but showing the device illustrated after the action of a second torque limiter in the case of operation in a second sense of motion opposite to the first; and FIG. 5 is a view similar to FIG. 2 showing a detail indicated by a circle V in FIG. 4 at the dog clutch connection.

DESCRIPTION OF THE PREFERRED EMBODIMENT

In FIG. 1 a longitudinal section has been shown of an uncoupling device embodying the invention. The two rotary machines between which this device forms the connection have not been illustrated in the drawings and will not be described in further detail. A first rotary shaft 1 forms part of the one of these rotary machines and is journalled in a roller bearing (not shown). A second rotary shaft 2 coaxial with the first shaft forms the connection between the first shaft 1 and the one of the rotary machines and the other rotary machine.

This second shaft 2 comprises two hollow parts 2a and 2b. The first part 2a has on its external periphery 3 an annular series of longitudinally extending splines 4 which are in engagement with another annular series of longitudinally-extending splines 5 disposed in a bore 6 of the second part 2b of the second shaft 2, the first part 2a being disposed within the bore 6 of the second part 2b. The end 1a of the first shaft 1 is disposed in an end portion of the bore 6 of the second part 2b of the second shaft 2 within the bore 6. Intermediate the opposite end faces of the two parts of the second shaft 2, a zone is provided which does not comprise splines 4 and 5, but accommodates an annular fluid-tight seal 7 of known type.

In similar manner to that which has been provided for the first shaft 1, the second shaft 2 and more precisely the second part 2b of the second shaft 2 is journalled in a roller bearing (not shown).

The first shaft 1 is driven by the motion of one of the rotary machines and the second shaft 2 is driven by the motion of the other of the rotary machines. The radial face 8 of the free end 1a of the first shaft 1 comprises a series of dogs (or teeth) 9. In a similar manner, the radial face 10 of the free end of the first part 2a of the second shaft 2 which lies opposite to the end 1a of the first shaft 1 comprises a series of dogs (or teeth) 11 of which the shape and the dimensions are determined so as to render them capable of cooperating with the dogs of the first shaft 1, and this is clearly illustrated in FIG. 2. The dogs 9 each have an inclined face 9a and the dogs 11 have an inclined face 11a.

The end portion 1a of the first shaft 1 comprises a bore or recess 12 and the first part 2a of the second shaft 2 likewise comprises a bore or recess 13 of the same diameter as the bore 12. In these bores 12 and 13 an intermediate shaft 14 coaxial with the first and second shafts 1 and 2 is accommodated with one half in each bore and comprising in each half at least one aperture 15 traversing each half of the intermediate shaft 14 and of which the axes 16 are perpendicular to the common axis of the three shafts 1, 2 and 14. Opposite to each aperture 15, co-axial apertures of the same diameter are similarly provided in the first shaft 1. Connecting and drive pins 17 are in the apertures 15 and they are of a length less than the external diameter of the end portion 1a of the first shaft 1 and than that of the end portion of the first part 2a of the second shaft 2.

Between the end portion 1a of the first shaft 1 and the remainder of the shaft 1 a section of lower strength is provided by a groove 18 machined in the external diameter of the shaft 1, termed herein "a frangible groove".

In a similar manner, between the two halves of the intermediate shaft 14 disposed respectively within the first shaft 1 and the second shaft 2 a section of lower strength is provided by a groove 19 machined in the outer diameter of the intermediate shaft 14 and again termed herein "a frangible groove".

The end of the first part 2a of the second shaft 2 opposite to that which comprises the dogs 11 has a bore 2c of a diameter greater than that of the bore 13 of the remainder of this part 2a so as to define a shoulder 2e with the bore 2c and comprises a diametral aperture 2f terminating at each side at the external diameter of the part 2a of the shaft 2 and thus forming two seatings in cooperation with the internal diameter of the bore 2g of the second part 2b of the second shaft 2. In the same zone, this bore 2g similarly comprises an annular groove 2h. At this end of the first part 2a of the second shaft 2 is mounted in the bore 2c a blocking element 20 coaxial with the shafts 1, 2 and 14. This element 20 comprises a helical spring 21 disposed in a diametral aperture 22 of a cylindrical bush 24 which abuts the shoulder 2e within the interior of the bore 2c of the end portion of the part 2a.

The element 20 is completed by two balls 23 which abut against respective end turns of the spring 21 within the aperture 22 and lodge themselves, each at one end of the of the aperture 2f of the part 2a of the shaft 2.

The operation of the device will now be briefly described of which the structure has just been described in order better to make apparent certain advantages of the invention. Normal operation is illustrated in FIGS. 1 and 2. Two operational phases are possible. In a first phase, the first shaft 1 is driving and the second shaft 2 is driven. The power transmission in this first sense of motion transmission is effected by the dog-clutch connection 9 and 11 between the driving shaft 1 and the driven shaft 2.

In an application where the first shaft 1 is the shaft of the starter of a turbo-machine and where the second shaft constitutes the connecting shaft to the auxiliaries gearbox of the turbo-machine, this first phase occurs during the starting of the turbo-machine and during this first phase a substantial torque is transmitted by the line of transmission shafts.

In a second phase, the first shaft 1 is driven and the second shaft 2 is driving. As a result of a clearance j provided between the inclined faces 9a and 11a of dogs 9 and 11, the power transmission in this second sense of motion transmission opposite to the first is effected by connection between the drive shaft 2 through the intermediate shaft 14 and the pins 17. In the application hereinbefore proposed this second phase applies after the starter has stopped and during this second phase a torque substantially lower than during the first phase and is due solely to the drive force of the shaft of the starter idling without opposing force and is transmitted through the line of transmission shafts.

Operational incidents due to various originating causes which it is not always possible to entirely overcome may appear in the one as in the other phase. These instances may thus become apparent in the application hereinbefore proposed during the starting of the turbo-machine and may lead to the development of an accidental excess torque in the line of transmission shafts. It is important to limit the transmission of power to a predetermined value of the maximum torque permitted in this first phase of operation. This limited value of the torque may, for example, be in certain cases of the order of 100 m daN. If this value were exceeded, the frangible groove 18 of the first shaft is fractured and the configuration illustrated in FIG. 3 then applies. All the elements of the device remain unchanged with the exception of the first shaft 1 of which the frangible groove 18 is sheared. The incident becomes apparent immediately because in the course of the starting phase, the total stoppage of the turbo-machine occurs. Any deterioration or more substantial damage is thus avoided.

In the second operational phase other incidents of different nature and origin can also be overcome. Thus incidents arising in the starter can cause unbalance forces or give rise to shock effects as a result of rubbing, for example. These effects while developing opposing forces and giving rise to a torque in the line of shafts which is greater than during a second operational phase under normal conditons will be liable to give rise to damaging reactions in the direction of the turbo-machine and in particular in the auxiliaries gearbox. It is, of course, important also to avoid these. In this second operational phase the limiting value of the admissible torque of 3 m daN can for example be retained in certain cases. When this value is exceeded, the frangible groove 19 is sheared and the configuration illustrated in FIGS. 4 and 5 then applies.

If deflection forces developed in the line of transmission shafts as a result of incidents arising at the starter during this second phase of operation also exceed a predetermined limit value, the frangible groove 19 is fractured and in the same way the configuration illustrated in FIGS. 4 and 5 applies. After fracture of the frangible groove 19, the inclined faces 9a and 11a of the dogs 9 and 11 enable the disengagement of radial end faces of the shaft 1 and shaft part 2a, as is illustrated in FIGS. 4 and 5. Furthermore, it is important after fracture at the frangible groove 19 to avoid contact between the shaft 1 and shaft part 2a between the normal operational position illustrated in FIG. 1 and the position after fracture of the frangible groove 19 as shown in FIG. 4, the first part 2a of the second shaft is spaced in the axial direction from the first shaft 1. In this way, the balls 23 become located within the groove 2h of the bore of the second part 2b of the second shaft 2. The balls 23 are maintained in the bottom of this groove 2h simultaneously by the action of the diametral spring 21 and by the action of centrifugal forces.

After fracture of frangible groove 19, in this second phase of operation, the first shaft 1 ceases to be driven in rotation and the second shaft 2 continues to be driven in rotation by its connection to the auxiliaries gearbox of the machine.

The above described device has a ratio of torque transmission in the opposed senses of rotation in a ratio lying between 1 to 5 and 1 to 500.

The stoppage of the first shaft 1 can also be used for generating a detection signal relying upon appropriate known means. This complementary arrangement enables the avoidance of an ultimate possibility of the starter being driven again without, as a preliminary, the defects having been overcome, which have given rise to the fracture of the frangible groove 19, which will avoid supplementary damage. In the application proposed, an incident at the starter in this second operation stage neither needs to have any other repercussion on the other machine nor to give rise to deterioration of the parts or other damage. The device enables the desired results to be obtained and the first part 2a of the second shaft 2 as well as the part of the intermediate shaft 14 which remains connected to it after fracture of the frangible groove 19 are maintained axially in the bore of the second part 2b of the second shaft 2 and contact is avoided between the first shaft and the part 2a of the second shaft 2.

We claim:

1. In a frangible device for coupling two rotary machines between which power is transmitted,
   a first shaft connected to one said machine, having a bore in one end thereof, and a frangible groove,
   a second shaft connected to the other said machine and having a bore in one end thereof,
   means defining a dog clutch operative between the first and second shafts in a first rotational sense,
   an intermediate shaft accommodated in the respective end bores of the first and second shafts, fast for rotation with said shafts, and having a frangible groove adapted to fracture at a lower torque value than that of the frangible groove of the first shaft and under conditions in which the sense of motion transmission is opposite to that intended to fracture the frangible groove of the first shaft, said intermediate shaft having two parts after fracture,
   means operative in the event of fracture of the frangible groove of the intermediate shaft to space the first and second shafts apart and the fractured parts of the intermediate shaft whereby to avoid mutual contact of these parts, said means serving to prevent axial motion of the second shaft under these conditions, the improvement comprising the provision on the dogs of the clutch of inclined opposed faces on the two halves thereof and spaced such that alternating deflections exerted on the first and second shafts causes uncoupling of the two halves of the clutch and thus of the shafts by the inclined faces riding up the one on the other, means operative in the event of fracture of the frangible groove of the intermediate shaft to retain one part of the fractured intermediate shaft rigid with the second shaft, said means operative in the event of fracture of the frangible groove of the intermediate shaft to space the first and second shafts apart, including a first part of the second shaft, a second part of the second shaft having a bore with a groove in the bore, spline means coupling the first and second parts, balls disposed adjacent the end of an first part of the second shaft opposite said dog clutch means and in transverse apertures thereof, a compression spring, a transverse bush housing the compression spring so that opposed ends thereof bias the balls radially outwardly, the arrangement being such that in the event of axial displacement of the first part of the second shaft relative to the second part thereof, the balls are displaced outwardly under the action of the spring and centrifugal force into the groove of the bore of the second shaft and are maintained therein so that contact between the dogs of the clutch and between the fractured ends of the intermediate shaft are prevented.

2. A device according to claim 1,
wherein the ratio of torque transmission in the opposed senses of rotation are in a ratio lying between 1 to 5 and 1 to 500.

3. In a frangible device for coupling two rotary machines between which power is transmitted, a first shaft connected to one said machine, having a recess in one end thereof, and a section incorporating a frangible groove, a second shaft connected to the other said machine and having a recess in one end thereof contiguous with the end recess of the first shaft, means defining a dog clutch operative between the first and second shafts in a first rotational sense, an intermediate shaft accommodated in the respective end recesses of the first and second shafts, fast for rotation with said shafts, and having a section with a frangible groove adapted to fracture at a lower torque value than that of the section with frangible groove of the first shaft and under conditions in which the sense of motion transmission is opposite to that intended to fracture the frangible groove of the first shaft, said intermediate shaft having two parts after fracture, means operative in the event of fracture of the section with frangible groove of the intermediate shaft to space the first and second shafts apart axially and also the fractured parts of the intermediate shaft whereby to avoid mutual contact of these shafts and parts, said means serving to prevent axial motion of the second shaft under these conditions, the improvement comprising the provision on the dogs of the clutch of inclined opposed faces on the two halves of the clutch and spaced such that alternating deflections exerted on the first and second shafts causes uncoupling of the two halves of the clutch and thus of the shafts by the opposed inclined faces riding up the one on the other, means operative in the event of fracture of the section with frangible groove of the intermediate shaft to retain one said part of the fractured intermediate shaft rigid with the second shaft and within said recess, said means operative in the event of fracture of the section with frangible groove of the intermediate shaft to space the first and second shafts apart, including a first, hollow, cylindrical, part of the second shaft having transverse apertures adjacent one end, a second, hollow, cylindrical, part of the second shaft having a bore with a groove in the bore, spline means coupling the first and second parts, members disposed adjacent the end of the first part of the second shaft in said transverse apertures thereof, resilient means, a transverse hollow member housing the resilient means so that opposed ends thereof bias the members radially outwardly, the arrangement being such that in the event of axial displacement of the first part of the second shaft relative to the second part thereof, the members are displaced outwardly under the action of the resilient means and centrifugal force into the groove of the bore of the second shaft and are maintained therein so that contacts between the dogs of the clutch and between the fractured ends of the intermediate shaft are prevented.

* * * * *